United States Patent [19]

Tjerrild

[11] 4,313,374
[45] Feb. 2, 1982

[54] MACHINE FOR HULLING NUTS

[75] Inventor: William J. Tjerrild, Acampo, Calif.

[73] Assignee: Tenneco West, Inc., Bakersfield, Calif.

[21] Appl. No.: 127,498

[22] Filed: Mar. 5, 1980

[51] Int. Cl.³ .............................................. B02B 3/00
[52] U.S. Cl. ...................................... 99/612; 99/617; 99/622; 99/623; 99/631
[58] Field of Search .......... 99/518, 519, 523, 574–576, 99/612, 613, 617–623, 631

[56] References Cited

U.S. PATENT DOCUMENTS

| | | | |
|---|---|---|---|
| 1,766,513 | 6/1930 | Heller | 99/612 |
| 2,405,561 | 8/1946 | Egedal | 99/622 |
| 2,428,903 | 10/1947 | Zeun | 99/623 |

*Primary Examiner*—Philip R. Coe
*Assistant Examiner*—Timothy F. Simone

*Attorney, Agent, or Firm*—Huebner & Worrel

[57] ABSTRACT

A machine for hulling nuts having a rotationally driven horizontal disc provided with an upwardly disposed abrasive surface; a cylindrical casing coaxially related to the disc, closely spaced from its periphery, and provided with a discharge opening; a cover closing the casing above the disc and provided with a supply opening adjacent to the discharge opening; and a plurality of blades spaced around the disc and extending generally radially across it to guide nuts deposited in an unhulled condition on the disc through the supply opening in a path around the disc and alternately centrally and peripherally of the disc toward the discharge opening, the hulls being abraded from the kernals as the nuts traverse the path and being urged centrifugally from the disc to fall between it and the casing while the separated kernels exit through the discharge opening.

13 Claims, 3 Drawing Figures

MACHINE FOR HULLING NUTS

BACKGROUND OF THE INVENTION

1. Field of the Invention

The present invention relates to a machine for hulling nuts, and more particularly to such a machine which, in a continuous operation, hulls pistachio nuts and the like by abrasion and separates the hulls from the remainder of the nuts.

2. Description of the Prior Art

Machines for removing a hard, inedible outer layer from vegetable food sources, such as nuts, are well known. However, all of these machines known to the applicant have one or more deficiencies. Typically, such deficiencies include relatively slow processing and damage to the kernel by crushing or friction inherent in the type of operation used in removing the hulls. Many such machines do not separate the removed hulls from the inner shells or the kernals or do so imperfectly. Certain hulling machines are not adjustable so as to handle variations in the nuts to be hulled, such as moisture content due to differences in growing or storing conditions, while other machines require excessive manual attention throughout the hulling operation. Pistachio nuts present serious hulling problems in connection with which the present invention is conveniently illustrated.

SUMMARY OF THE INVENTION

It is an object of the present invention to provide an improved machine for hulling pistachio nuts and the like.

Another object is to provide such a machine which can be adjusted to accommodate various characteristics for complete hulling of nuts without injury to the kernels.

Another object is to provide such a machine which, once adjusted, rapidly and continuously removes the hulls without further attention.

Another object is to provide such a machine which separates the detached hulls from the nuts in a continuous operation.

Another object is to provide a machine for hulling nuts which removes the hulls by abrasion against a rotating disc while the nuts are guided in a path alternately toward and from the center of the disc with the detached hulls being separated from the nuts by centrifugal force exerted along the path.

Another object is to provide such a machine which utilizes guide blades which can be conveniently adjusted to vary the time of travel of the nuts through the machine and control their tumbling velocity.

Another object is to provide such a machine wherein the abrasion process can be selectively lubricated by the addition of water or other fluid.

PRIOR ART STATEMENT

Characterizing the closest prior art of which the applicant is aware and in compliance with 37 C.F.R. 1.97 and 1.98, attention is invited to the following patents, copies of which are enclosed.

Vaughan, U.S. Pat. No. 1,574,138, Feb. 23, 1926
Heller, U.S. Pat. No. 1,766,513, June 24, 1930
Zeun, U.S. Pat. No. 2,428,903, Oct. 14, 1947

The Vaughan Patent is believed relevent in its disclosure of a nut hulling machine utilizing a rotating abrasive disc. The machine utilizes vanes to sweep the hulls and detached kernels from the disc. However, the vanes are not adjustable and the hulls and kernels make a single pass over the disc from its center to its periphery where they are discharged in intermixed condition.

The Heller U.S. Pat. No. 1,766,513 discloses a somewhat similar machine for decorticating grains in which weight of the grains holds them against a "grinding disc or stone" while the grains travel outwardly in radial channels. Wipers are used to sweep the removed shells into "air channels" alternating with the radial channels where the shells, apparently, are removed by a flow of air.

The Zeun U.S. Pat. No. 2,428,903 is believed relevent in its disclosure of a machine for the removal of skin from coconut meat by an abrasive disc supplied with water. The detached skin is centrifugally separated and discharged periperally of the disc. However, the nut meat is previously husked and shelled and is held against the disc manually during the abrading operation.

DESCRIPTION OF THE PREFERRED EMBODIMENT

Figure 1:
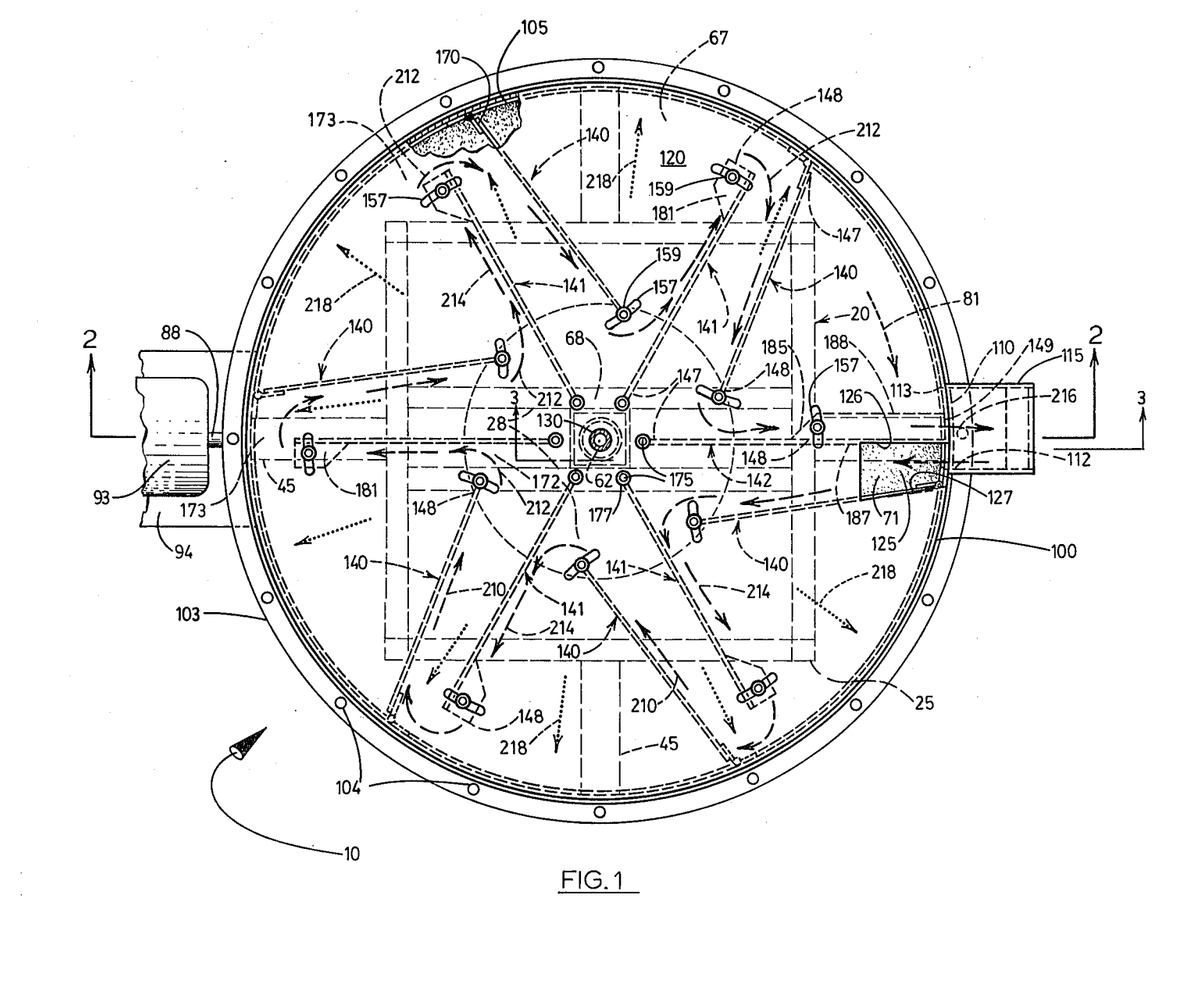
FIG. 1 is a top plan view of a machine for hulling nuts which embodies the principles of the present invention with portions broken away for illustrative convenience.
Figure 2:
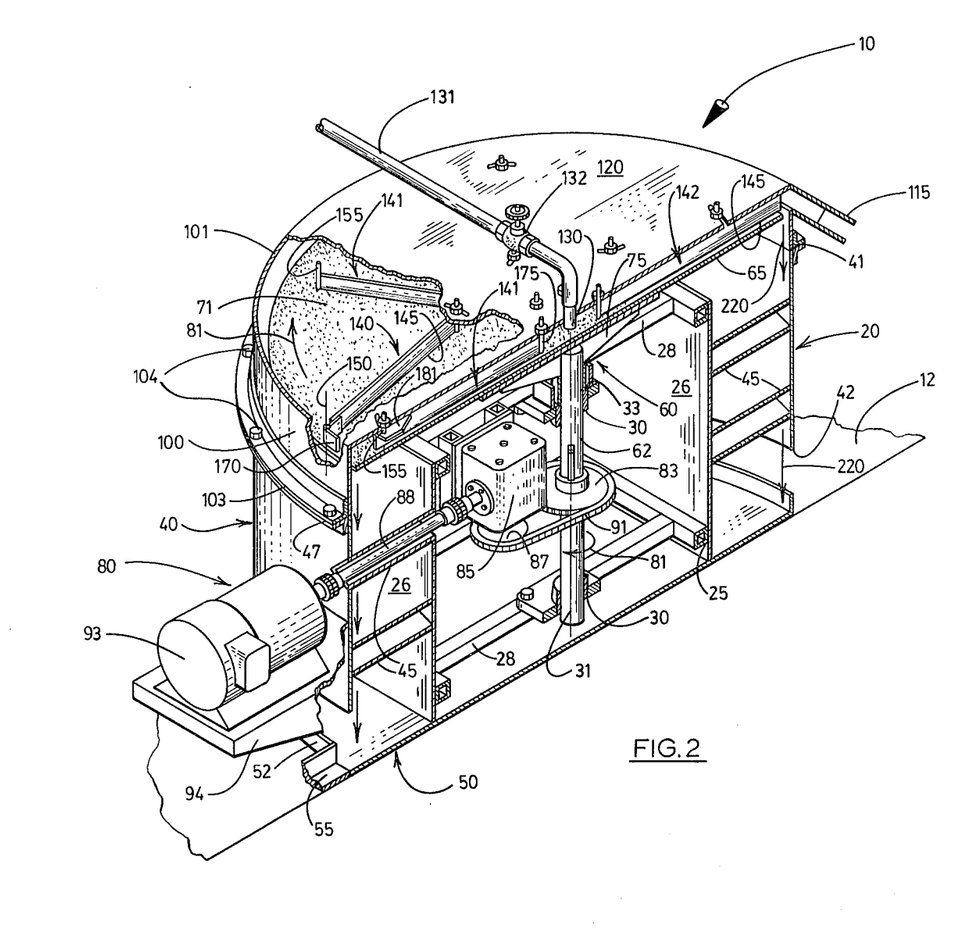
FIG. 2 is a perspective view of the machine sectioned along line 2—2 of FIG. 1.
Figure 3:
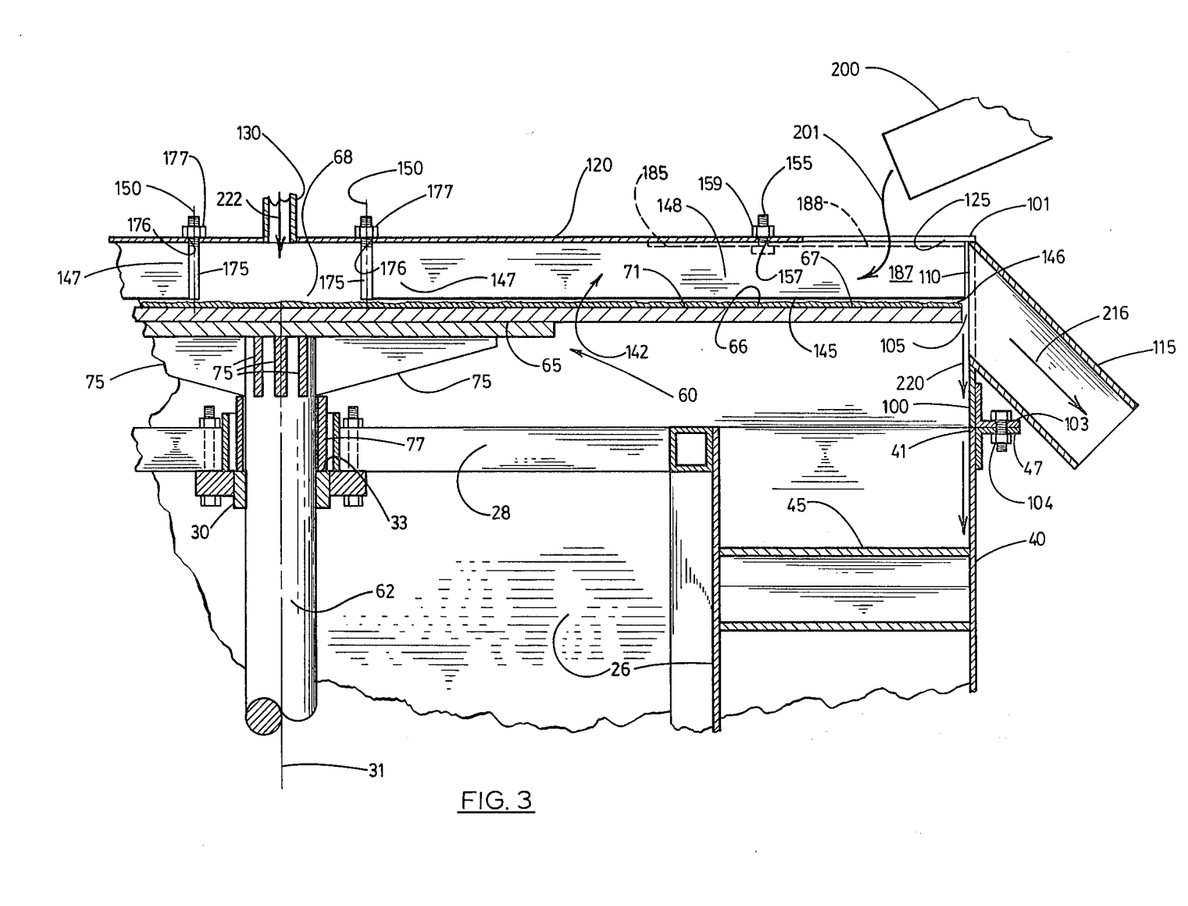
FIG. 3 is a fragmentary section taken at the position indicated by line 3—3 of FIG. 1.

Referring more particularly to the drawings, the figures show a machine 10 for hulling nuts embodying the principles of the present invention. The machine, typically, is supported on a floor 12 and includes a base indicated generally by the numeral 20 and unitarily constructed, as by welding. The base includes a central box 25 of square horizontal cross section which extends upwardly from the floor. The box has vertical sides 26 and is open at its upper and lower ends. A pair 28 of horizontal bars extend in parallel spaced relation centrally across each end of the box. Each pair of bars supports a sleeve bearing 30. The bearings are aligned about a substantially vertical axis 31 disposed centrally of the box. The upper of the bearings is provided with an annular, upwardly facing thrust surface 33.

The base 20 includes a cylinder 40 which circumscribes the box 25 and is aligned with the vertical axis 31. The cylinder has an open upper axial end 41 which is substantially coplanar with the upper end of the box and has an open lower end 42 which is spaced upwardly of the floor 12. The cylinder is fixedly mounted on the box by eight square horizontal tubes 45 extending radially inwardly from the cylinder to the box. The tubes are disposed in pairs individually related to each side 26 of the box, each pair being disposed in vertically spaced relation centrally of the corresponding side of the box. The upper end of the cylinder is circumscribed by a horizontal annular flange 47.

The apparatus 10 has an annular trough 50 mounted on the floor 25 concentrically with the cylinder 40. The trough has an outer wall 52 having a diameter equal to that of the cylinder and extending from the floor toward the lower end 42 of the cylinder. The trough has a fragmentarily represented channel 55 extended radially from it.

The apparatus 10 has a disc assembly 60 of unitary construction which is received in the bearings 30 for rotation about the upright axis 31. The assembly has a central cylindrical journal 62 which is rotationally fitted in the bearings and extends from a lower axial end adjacent to the floor 12 to an upper axial end spaced upwardly of the thrust surface 33. A horizontal disc 65 is mounted on the upper end of the journal with the center of the disc substantially aligned with the axis. The periphery of the disc has a diameter somewhat less than the interior diameter of the cylinder 40. The disc has a planar upper abrading surface 66 which is ground so as to be substantially flat and disposed substantially normal to the axis. The surface includes a peripheral portion 67 and a central portion 68. A layer of abrasive grit 71 is applied adhesively to the upper surface. The layer substantially covers the surface and is of uniform depth. Preferably, the layer is of silicon carbide, 16 grit particles and is approximately 0.1875 inch (approximately 4.75 mm) in thickness.

The disc assembly 60 has a plurality of gusset plates 75 extending radially from the journal 62 toward the periphery of the disc 65 at its side opposite the surface 66. These plates are angularly spaced about the journal, and the ends of the plates adjacent to the journal extend downwardly therefrom approximately one-half of the distance from the disc to the thrust surface 33. The assembly has a cylindrical collar 77 concentrically related to the journal and extended between the gusset plates and the thrust surface. The collar is slidably fitted to the journal so that the weight of the disc assembly is rested on the collar and transferred through it to the thrust surface.

The machine 10 includes a power rotational drive assembly, indicated generally by the numeral 80, which drives the disc assembly in a direction of rotation indicated by the arrows 81. The assembly is preferably of a type adapted selectively to drive the disc at a variable speed. It has been found that with a disc approximately 48 inches (approximately 23 cm) in diameter, a speed range of 100 to 500 r.p.m. provides for the hulling of pistachio nuts of a variety of characteristics at a rate of approximately 3,500 lbs. (1360 kg) per hour. The drive assembly includes a driven sprocket 83 concentrically fixed on the journal 62 between the bearings 30 and a speed reducer 85 of well-known construction mounted on a bracket extending downwardly from one of the bars of the upper pairs 28 thereof. The reducer has an output shaft which is parallel to the journal and is fitted with a sprocket 87 aligned with the driven sprocket. An input shaft is extended through one of the square tubes 45 to the reducer. An endless chain 91 links the sprockets 83 and 87 to drive the disc assembly from the reducer. The drive assembly is provided with an electric motor 93 mounted externally of the cylinder 40 on a bracket 94 and connected in rotational driving relation to the input shaft oppositely of the reducer.

The machine 10 has a cylindrical casing 100 mounted on the upper end 41 of the cylinder 40 and coaxially related to the disc 65. The casing circumscribes the disc and extends upwardly from the cylinder to an upper axial end 101 spaced substantially above the disc. The disc is thus disposed for rotation concentrically within the casing. The lower axial end of the casing is open and is circumscribed by a flange 103 mating axially with the flange 47. These flanges are provided with a plurality of angularly spaced, aligned bores, not shown, individually fitted with bolt assemblies 104 which detachably secure the casing to the cylinder. The radius of the periphery of the disc is less than the radius of the interior of the casing so that there is a gap 105 between the periphery of the disc and the casing. The gap preferably has a width substantially less than the smallest diameter of a shell or kernel of a nut to be hulled by the machine. For hulling pistachio nuts, the width of this gap is, typically, 0.25 inch (6.35 mm).

The casing 100 is provided with a circumferentially extending discharge opening 110. The opening extends in a direction parallel to the axis 31 from the upper end 101 of the casing to a point approximately at the level of the underside of the disc 65. The opening has a first side 112 and an opposite second side 113 spaced angularly from each other about the axis. The first side is spaced from the second side in the direction of rotation indicated by the arrows 81. These sides lie in individual planes which include the axis and extend radially therefrom. The included angle between these planes is relatively small. Typically, the diameter of the casing is approximately 48 inches (approximately 123 cm) and the width of the opening is approximately 6 inches (approximately 15 cm). A spout 115 is mounted on the casing and is extended downwardly and radially outwardly from the opening.

The machine 10 has a discoidal cover 120 which is mounted on and closes the upper end 101 of the casing 100. The cover is substantially normal to the axis 31 and is, therefore, substantially parallel to the upper surface 66 of the disc 65. The cover, typically, is spaced upwardly from the disc a distance of approximately 2 inches (5 cm). The cover is provided with a peripherally disposed supply opening 125 adjacent to the discharge opening 110. In a machine having the typical dimensions previously described, the supply opening extends inwardly from the periphery of the casing a distance of approximately 6 inches (15 cm). The opening is trapezoidal in shape, having a first edge 126 lying in a plane which includes the axis 31 and extends radially therefrom in an intersecting relation to the discharge opening. This plane is spaced approximately two-thirds of the distance in the direction 81 of rotation from the first side 112 of the discharge opening toward its second side 113. The supply opening has a second edge 127 opposite the first edge and spaced therefrom in the direction of rotation approximately one-half of the distance between the edges of the discharge opening. As a result, the first and second edges of the supply opening, respectively, are spaced in the direction of rotation from the first and second sides of the discharge opening. The discharge opening thus extends oppositely of the direction of rotation from the plane of its first edge. The end of the second edge toward the center of the cover is spaced somewhat in the direction of rotation from the peripherally disposed end of the second edge so that the second edge is angularly related to the first edge.

The cover 120 has a central, liquid admitting fitting 130 for admitting water onto the central portion 68 of the surface 66 of the disc 65. The fitting is connected by a conduit 131 to a source of water, not shown, capable of providing a flow in the order of 50 gallons (190 liters) per minute. The conduit is provided with a valve 132 for regulating the flow of water.

The machine 10 includes six substantially identical first or inward path guide blades, or alternate but directing vanes 140. The machine includes six second intermediate blades or nut directing vanes 141 and 142. The second blades include five substantially identical outward path guide blades 141 and a single discharge blade 142. All of the blades are elongated and disposed between the cover 120 and the upper surface 66 of the disc and are stationary when the machine is in operation. Each blade has a linear lower edge 145 disposed in parallel and upwardly spaced adjacent relation to the upper surface 66 of the disc 65 and to the abrasive layer of grit 71. Each lower edge is preferably spaced substantially equally from the disc a distance in the range of 0.0625 to 0.1875 inch (1.6 to 4.8 mm). Each lower edge thus defines a debris passage 146 between it and the grit-covered upper surface. Each blade has an entrance end section terminating in an entrance end 147. Each of the inward and outward path guide blades has an exit section which is opposite the entrance section or passage and terminates in an exit end 148. The discharge blade has a corresponding exit section which is relatively elongated and terminates in a discharge end 149. The first and second blades extend generally radially of the axis 31. The entrance end of each first blade is disposed toward the casing 100 so that, in relation to the casing, the entrance end is the outer end of the blade and the exit end is the inner end of the blade. Each second blade is disposed with its entrance end toward the axis so that this end is the inner end of the blade and the exit end is the outer end. The length of the blades is such that the first blades extend across the peripheral portion 67 of the surface 66 toward and substantially over its central portion 68 while the second blades extend across the central portion toward and substantially over the peripheral section.

Each blade 140, 141, and 142 is mounted on the casing 100 for limited adjustable pivotal movement about individual axes 150 which are parallel to the axis 31. Each of these axes is disposed substantially at the entrance end 147 of the corresponding blade. Due to this pivotal movement, the angle of each blade relative to a radius extended therethrough from the axis 31 is adjustable through an acute angle relative to the radius. When the blades are disposed at the midpoints of their respective pivotal movement, the second blades 141 and 142 extend substantially along a radius from the axis while the first blades 140 are angularly related to such a radius. When each first blade is disposed at the midpoint of its movement, its exit end 148 is spaced somewhat in the direction 81 of rotation from such a radius extended through the entrance end of the first blade. As a result, each first blade extends forwardly in the direction of rotation.

The blades 140, 141, and 142 each have a bolt fixedly mounted thereon toward the exit end 148 thereof. The bolt has a screw-threaded shank 155 which extends upwardly from the blade through a corresponding arcuate slot 157 in the cover 120. This slot is concentric with the axis 150 of the corresponding blade. Each shank is screw-threadably engaged upwardly by a nut 159 which, when tightened, clamps the corresponding blade to the cover to maintain the blade at a selected point of adjustment along the pivotal movement about its axis 150.

The second blades 141 and 142, as previously described, extend generally along individual radii from the axis 31. These radii are substantially equally angularly spaced about the axis with the radius corresponding to the discharge blade 142 lying substantially in a plane extended radially from the axis and including the first edge 126 of the supply opening 125. The first blades 140 are equally angularly spaced about the axis and are disposed individually between the second blades. The first and second blades thus alternate about the axis. An outward path guide blade 141 is, therefore, disposed between each adjacent pair of the first or inward path guide blades 140, except for the pair of inward guide blades adjacent to and opposite of the plane wherein the discharge blade extends. The one of the inward path blades adjacent to this blade and disposed in the direction 81 of revolution from it is substantially aligned with the edge 127 of the supply opening. The relative disposition of this one of the first blades and the discharge blade is substantially identical to the relative disposition of each of the other inward path guide blades to the adjacent outward path guide blades disposed therefrom in a direction opposite the direction 81 of revolution.

Referring in greater detail to the blades 140, 141, and 142, the entrance end 147 of each of the first or inward path guide blades 140 is closely adjacent to the inner surface of the casing 100 as is the correspondingly pivotal axis 150. Each of these entrance ends is interconnected with the casing by a hinge 170 disposed to provide the previously described pivotal movement about this axis. The length of each inward guide blade is approximately two-thirds of the radius of the disc 65 so that the exit end 148 of the blade is spaced radially from the axis 31, providing a corresponding first nut passage 172 past the blade and disposed between it and the axis.

The outward path guide blades 141 are substantially equal in length to the blades 140 so that the exit ends 148 of the outward guide blades are spaced substantially from the casing 100 and the periphery of the disc 65. A second nut passage 173 is thus provided past each of these blades between its exit end and the casing. The entrance ends 147 and the corresponding axes 150 of these blades are adjacent to the axis 31. Each of these entrance ends is provided with a screw-threaded stud 175 aligned with the axis and extended individually upwardly through a corresponding aligned bore 176 in the cover 120. Each stud is pivotally fitted in the corresponding bore, and, outwardly of the cover, is screw-threadably engaged by a nut 177. Each outward path guide blade is provided with a shield plate 181 mounted upwardly on its exit section toward its exit end 148. This plate extends from the exit section oppositely of the direction of rotation and parallel to the inner surface of the cover beneath the corresponding slot 157. The corresponding shank 155 is mounted on this plate so as to extend upwardly therefrom through this slot.

The discharge blade 142 is similar to each of the blades 141 in the disposition of its entrance end 147 relative to the axis 31 and in having a substantially identical stud 175 which extends through a bore 176 in the cover 120 and is engaged by a nut 177. The discharge blade has a shield plate 185 from which the corresponding shank 155 extends. This shank, the portion of the shield plate adjacent to it, and the portion of the discharge blade extending from this shank to the entrance end of the discharge blade are substantially identical to the corresponding portion of the blades 141. However, the exit section of the discharge blade has a unitary extension 187 mounted on it so that the discharge end 149 is substantially engaged with the casing at the discharge opening 110. The shield plate of the discharge blade is provided with a corresponding extension 188 which is parallel to the cover 100. Since the discharge blade extends radially from the axis 31, the discharge opening is disposed at a point on the casing radially outwardly of the exit section of the discharge blade. The discharge opening thus extends from this point in the direction 81 of rotation toward the one of the first blades which is adjacent to the discharge blade and is disposed in the direction of rotation therefrom.

With the blades 140, 141, and 142 disposed relative to each other and the casing 100 and cover 120 as previously described and as best shown in FIG. 2, the supply opening 125 is disposed above a point on the upper surface. This point is spaced somewhat from the entrance section of the one of the first blades 140 which is adjacent to the supply opening and is disposed therefrom in the direction 81 of rotation. With this relative disposition of the blades, casing, and cover, the discharge blade 142 is disposed in the direction of rotation from the exit ends 148 of both the inward path guide blades 140 and the outward path guide blades 141.

The machine 10 is utilized with a fragmentarily represented source 200, shown in FIG. 3, of unhulled nuts. The source is disposed so that nuts from the source are received into the supply opening 125 as indicated by the arrow 201. Typically, this source is a well-known vibratory feeder which is adapted continuously to supply the nuts at a selected rate.

OPERATION

The operation of the described embodiment of the present invention is believed to be clearly apparent, and is briefly summarized at this point. In operation, the machine is supplied with unhulled nuts from the source 200 as indicated by the arrow 201 through the supply opening 125 with the disc assembly 60 being rotationally driven in the direction 81 by the drive assembly 80.

The nuts descend gravitationally toward the disc 60 through the supply opening 125 and are received onto the surface 66 having the layer of grit 71. The nuts are gravitationally rested on this surface and are carried by the rotation of the disc in the direction 81. The nuts are carried in this direction toward the one of the blades 140 adjacent to the supply opening. The nuts engage the section of this blade adjacent to its entrance end 147. Since, as previously described, this blade is angularly related to a radius from the axis 31, the nuts are urged by their contact with this blade in a first, generally radially inward direction, indicated by the adjacent one of the arrows 210, along the blade from the peripheral portion 67 of the surface toward its central portion 68 and the axis. As the nuts move along the blade, they are tumbled against the blade on the surface by its movement toward the blade. This tumbling movement of the nuts together with their translational movement along the blade causes the hulls of the nuts to be abraded from the shells, kernels or other inner portions of the nuts by the grit into substantially smaller fragments. The blade guides the nuts therealong until they pass beyond its exit end 148 while the abraded fragments tend to pass through the corresponding passage 146 and are thus separated from the nuts. At the exit end 148 of the blade, the nuts are no longer guided by the blade and are carried circumferentially of the disc in a direction indicated by the corresponding arrow 212 through the corresponding passage 172 in the direction 81 toward the adjacent one of the blades 141 or 142.

Similar tumbling and translational movements of the nuts occur at each of the inward guide blades 140. The rotation of the disc 60 carries the nuts, as indicated by the arrows 212, from each of these blades toward the one of the outward guide blades 141 or the discharge blade 142 disposed adjacent thereto in the direction of rotation 81. Since the section of each of these latter blades adjacent to its entrance end 147 extends farther toward the axis 31 than do the inward guide blades, the nuts engage this section whereby they are centrifugally urged to travel radially outwardly along the blade in a second direction, indicated by the numeral 214. This second direction is generally opposite of the direction 210 and toward the exit end 148 of the corresponding blade. As the nuts travel in this direction, they are again tumbled on the surface for further abrasive hull-removing and fragmenting action by the grit 71. The nuts are guided by each outward guide blade until they pass from it about its exit end 148 through the corresponding passage 173 while the abraded hulls tend to pass through the corresponding passage 146.

At this point, the rotation of the disc 60 carries the nuts toward the next adjacent one of the inward path guide blades 140 in the direction 81 of rotation. The unhulled nuts and kernels are too large to pass through the gap 105 and, due to the corresponding hinge 170, cannot bypass this next adjacent blade outwardly of its entrance end 147. The nuts and kernels are, therefore, urged by the inward guide blade to move again centrally of the disc until they pass from the exit end 148 of this blade to the next adjacent outward guide blade in the direction 81. As a result, the nuts are guided repeatedly to traverse the surface 66 in a reciprocal path of movement alternately toward and from the axis 31 by each adjacent pair of blades 140 and 141. The abrasive action of the grit 71 and resultant hull removal continues as the nuts traverse the disc. Finally, the nuts pass from the one of the inward guide blades adjacent to the discharge blade 142 and disposed in a direction therefrom opposite of the direction of rotation 81. The nuts then engage the discharge blade and are guided by it toward the discharge opening 110. The abrasive action continues as the nuts approach this opening to complete the hull removal occuring while the nuts were guided by the blades 140 and 141. The separated kernels are guided by the extension 187 of the discharge blade and removed from the disc 65 through the discharge opening, as indicated by the arrows 216, onto the spout 115 and discharged from the machine 10.

The path of the nuts, indicated by the arrows 210, 212, 214, and 216, is generally in the direction of rotation 81 from the supply opening 125 to the discharge opening 110. The overall length of this path is substantially constant. However, the time required to travel the path and, therefore, the amount of abrasion performed on the hull of each nut can be varied by adjusting the angular position of the blades 140, 141, and 142 about their respective axes 150. The angle of the inward guide blades 140 can be varied to increase or decrease the component of the force exerted by the rotation of the disc in the direction 210, and the corresponding slots 157 are disposed so that there is always some such component. The angular position of the blades 141 and 142 can be adjustably varied so that a component of the force of the disc against the nuts either slightly aids or slightly opposes the centrifugal force which always urges the tumbled nuts outwardly along these blades. The forces urging the nuts along the blades can thus be varied to lengthen or shorten the time the nuts remain on the disc 60 to accommodate nuts having hulls of different hardness due to the variety of nut or to growing or storage conditions.

As the hulls are abraded from the shells of the nuts during passage of the latter from the supply opening 125 to the discharge opening 110, the hulls are broken and pulverized by the action of the grit 71 into fragments which are substantially smaller than the shells. The fragments are urged centrifugally to move toward the periphery of the disc 65 as indicated by the arrows 218. At the periphery, the fragments are gravitationally urged through the gap 105 toward the trough 50 between the box 25 and cylinder 40, as indicated by the arrows 220. The hulls are thus separated from the shells containing the kernels which, as previously described, are too wide to pass through the gap.

When the machine 10 is continuously hulling nuts, it is advantageous to supply a flow of water through the fitting 130 to the center of the surface 66 as indicated by the arrow 222 in FIG. 3. The water is urged centrifugally toward the periphery of the disc 65 and is discharged gravitationally through the gap 105 into the trough 50. The water thus follows the path of the abraded portions of the nut hulls indicated by the arrows 218 and 220 and assists in carrying the hulls from the disc. Since the water flows over the grit 71 during the abrading of the hulls, the water also lubricates the nuts during this process. The rate of flow can be selectively regulated or shut off by the valve 132.

The abraded hull portions and water which are discharged into the trough 50 can be removed in any suitable manner. However, it is advantageous to allow the hulls to flow into the channel 55 with the water where any suitable apparatus, not shown, may be utilized to remove the hull portions and recirculate the water to the fitting 130.

As can be seen from the described operation of the machine, it is adapted to be continuously supplied with nuts through the supply opening 125 to separate the hulls of the nuts from the shells containing the kernels by abrasion, and to discharge the separated hulls into the trough 50 while discharging the shells containing the kernels through the opening 110. The length of time each nut is abraded to remove its hull can be varied by selectively adjusting the angular positions of the blades 140, 141, and 142 about their respective axes 150 by varying the rotational speed of the disc 65 with the drive assembly 80. The abrading and separating process can be facilitated by supplying a selected flow of water through the fitting 130. As a result, the machine is adapted to remove the hulls from pistachio nuts and the like although the nuts are supplied at various rates and have been grown, harvested, and stored under a variety of conditions.

Although the invention has been shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A machine for hulling nuts comprising:
   A. a disc having a center, a periphery, and an abrading surface;
   B. means mounting the disc for rotation about a substantially erect concentric axis with the abrading surface upwardly disposed;
   C. powered means for rotating the disc in a predetermined direction;
   D. means for delivering nuts to be hulled to the abrading surface; and
   E. a plurality of elongated, nut-directing vanes mounted in adjacent upwardly spaced relation to the abrading surface defining debris passages between the vanes and the surface, said vanes having inner ends adjacent to the center of the disc and outer ends outwardly thereof, successive vanes being oppositely angularly related to respective radii of the disc to define a successive inwardly and outwardly extended reciprocal path of movement of the nuts over the abrading surface.

2. The machine of claim 1 in which the nuts have the hulls abraded from their kernels in travel along the path of movement and the resultant debris is moved centrifugally by disc rotation and the machine has an annular casing mounted in concentric circumscribing relation to the disc and spaced therefrom to define a debris passage therebetween.

3. The machine of claim 1 in which the nuts have the hulls abraded from their kernels in travel along the path of movement and the machine has means for removing such kernels from the path.

4. A machine for hulling nuts having outer hulls encasing inner portions of predetermined thickness comprising:
   A. a horizontal disc having a planar, abrasive upper surface having a peripheral portion and a central portion;
   B. means supporting the disc for rotation about a central upright axis;
   C. powered means for driving the disc in a predetermined direction of rotation about the axis;
   D. a stationary blade having an elongated linear edge;
   E. means supporting the blade with the edge disposed in parallel, adjacent, spaced relation to said surface and defining a gap therebetween of a width less than the predetermined thickness of the inner portions of the nuts, said blade being extended across the surface from one of said portions thereof toward the other of said portions; and
   F. means for supplying nuts to be hulled onto said one portion to be carried by the disc in said direction into engagement with the blade and guided thereby in movement therealong toward said other portion while gravitationally rested on the surface, the hulls of the nuts being abraded from said inner portions of the nuts by the surface of the disc during such movement and being carried on the disc through the gap between the edge and the surface and thereby being separated from said inner portions of the nuts which continue along the blade toward said other portion of the disc.

5. The machine of claim 4 wherein the hulls are abraded from the inner portions in fragments substantially smaller than the inner portions and rotation of the disc centrifugally urges such fragments toward the peripheral portion of the disc and the machine further comprises:
   A. a cylindrical casing circumscribing the disc and spaced from the peripheral portion thereof a distance less than the thickness of the inner portions so that the fragments are urged gravitationally between the disc and the casing while the inner portions are retained on the disc; and
   B. means for removing the inner portions from the disc.

6. A machine for hulling nuts comprising:

A. a disc having a center, a periphery, and a substantially planar abrading surface;
B. means mounting the disc for rotation about a substantially erect concentric axis with the abrading surface upwardly disposed;
C. powered means for rotating the disc in a predetermined direction;
D. means for delivering nuts to be hulled to the abrading surface; and
E. a plurality of elongated, nut-directing vanes mounted in stationary positions in upwardly spaced relation to the abrading surface and defining debris passages between the vanes and the surface, said vanes having inner ends in adjacent spaced relation to the center of the disc to provide a nut passage therebetween and outer ends in inwardly spaced relation to the periphery of the disc to provide a nut passage therebetween, successive vanes being oppositely angularly related to respective radii of the disc to define a successively inwardly and outwardly extended reciprocal path of movement of the nuts over the abrading surfaces.

7. A machine for hulling pistachio nuts and the like comprising:
A. a cylindrical casing having an upright axis;
B. a circular disc having an abrasive surface;
C. means mounting the disc substantially coaxially within the casing for rotation relative thereto with the abrasive surface upwardly disposed, the radius of the disc being less then the interior radius of the casing by a difference such that abraded hulls can pass between the disc and casing but inner portions of the nuts are excluded;
D. powered means for driving the disc in a predetermined direction of rotation about the axis;
E. an elongated first blade mounted on the casing in parallel, closely adjacent relation to the abrasive surface having an inner passage adjacent to the center of the disc and being extended therefrom generally radially of the disc and forwardly with respect to said direction of rotation;
F. an elongated second blade mounted on the casing in parallel, closely adjacent relation to the abrasive surface and being extended generally radially from the center of the disc to a point spaced from the casing;
G. means for supplying nuts in an unhulled condition onto the abrasive surface for successive engagement by the blades whereby during rotation of the disc the nuts are caused to travel inwardly along the first blade for passage through the inner passage and thence outwardly along the second blade, the nuts being gravitationally rested on the abrasive surface and being tumbled thereon by engagement with each blade so that the hulls are abraded from inner portions of the nuts, the abraded hulls being urged centrifugally toward the periphery of the disc to fall between the disc and the casing for separation of hulls from the inner portions of the nuts; and
H. means disposed radially outwardly of the second blade for removing the separated inner portions of the nuts from the abrasive surface.

8. The machine of claim 7 having a plurality of said first blades and a plurality of said second blades alternately angularly spaced about the disc so that the nuts are guided repeatedly to traverse the abrasive surface inwardly and outwardly of the disc.

9. The machine of claim 8 wherein the casing has an opening extended circumferentially thereof from a point radially outwardly of one of the first blades; wherein the means for removing the separated inner portions comprises an extension mounted on said one blade and projecting therefrom toward said point to guide said inner portions of the nuts toward the opening for discharge therethrough; and wherein the remainder of the second blades have an outer passage closely adjacent to the casing.

10. The machine of claim 7 further comprising:
A. means mounting each of the blades for pivotal movement about an individual axis parallel to said upright axis for adjustment of the angular relation of the blade relative to a radius extended from said upright axis; and
B. means for releasably clamping each blade at an adjusted pivotal position about the pivotal axis thereof.

11. The machine of claim 7 further comprising means for supplying a liquid centrally of the disc, the liquid being centrifugally urged toward the periphery of the disc to lubricate the nuts while the hulls are abraded and to carry the abraded hulls toward the periphery of the disc, the liquid being discharged together with the hulls between the disc and the casing.

12. A machine for hulling pistachio nuts and the like comprising:
A. a base having a bearing defining an upright axis;
B. a cylindrical casing aligned with the axis and mounted on the base upwardly of the bearing, the casing having an upper end and a discharge opening extending in a predetermined direction circumferentially of the casing from a plane extended radially from the axis;
C. a discoidal cover normal to the axis closing the upper end of the casing and having a peripherally disposed supply opening adjacent to the discharge opening to receive unhulled nuts, the supply opening extending circumferentially about the axis in a direction opposite said predetermined direction and away from said plane to an edge of said opening spaced circumferentially about the axis from the discharge opening;
D. a disc concentrically disposed within the casing above the bearing and downwardly spaced from the cover with the periphery of the disc spaced from the casing a distance substantially less than the exterior dimensions of the kernel of said nuts, the disc having a planar, abrasive upper surface;
E. means connected to the disc downwardly thereof and received in the bearing mounting the disc for rotation therein concentrically within the casing;
F. power means for driving the disc in a direction of rotation opposite to said predetermined direction;
G. a plurality of inward path guide blades disposed in angularly spaced relation around the disc between the disc and the cover, each inward guide blade having a linear lower edge substantially parallel to the disc and spaced somewhat therefrom, an entrance end disposed adjacent to the casing, and an opposite exit end spaced radially from the axis and spaced in the direction of rotation from a radius extended from the axis through the entrance end, the entrance end of one of said blades being substantially aligned with said edge of the supply opening;

H. a plurality of outward path guide blades disposed between the disc and the cover, each outward guide blade having a linear lower edge substantially parallel to the disc and spaced somewhat therefrom, an entrance end adjacent to the axis, and an opposite exit end spaced substantially radially from the casing, said outward path guide blades being one less in number than the inward path guide blades and being spaced around the disc individually between each adjacent pair of inward path guide blades other than the pair thereof opposite of said plane and adjacent thereto; and I. a discharge blade disposed between the cover and the disc having a linear lower edge substantially parallel to the disc and slidably fitted thereto, the discharge blade being extended along said plane and having an entrance end adjacent to the axis and an opposite discharge end adjacent to the casing, whereby nuts received through the supply opening are gravitationally rested on the abrasive surface of the disc and are guided thereon by the blades in a path generally in the direction of rotation and alternately inwardly along the inward path guide vanes and outwardly along the outward path guide vanes, the hulls being abraded from the kernels of the nuts by the rotation of the disc and the abraded hulls being urged centrifugally toward the periphery of the disc to be gravitationally discharged between the periphery of the disc and the casing as the hulls are abraded from the kernels while the kernels continue along said path toward the discharge blade which guides the separated kernels thereby toward the discharge opening for discharge therethrough.

13. The machine of claim 12 wherein:

A. the entrance ends of the inward path guide blades are mounted on the casing for pivotal movement about individual upright axes which are closely adjacent to the corresponding entrance ends and are inwardly adjacent to the casing, the exit end of each of said blades having means for releasably clamping said exit end at a selected point along said pivotal movement; and B. the entrance end of the discharge blade and the entrance ends of each of the outward path guide blades are mounted on the casing for pivotal movement about individual upright axes closely adjacent to the corresponding entrance end, the exit end of each of said blades having means for releasably clamping said exit end at a selected position along said pivotal movement.

* * * * *